(12) United States Patent
Chu et al.

(10) Patent No.: US 9,798,380 B2
(45) Date of Patent: Oct. 24, 2017

(54) MODULAR APPARATUS AND SYSTEM FOR RECONFIGURABLE USER INPUTS

(71) Applicant: GRANT & UNION INC., Kitchener (CA)

(72) Inventors: Calvin Chu, Kitchener (CA); Ashok Parth Davé, Kitchener (CA); Shadab Ui Rashid, Kitchener (CA); Fred Ting, Kitchener (CA); Ray Zhou, Kitchener (CA)

(73) Assignee: GRANT & UNION INC., Kitchener, ON (CA)

( * ) Notice: Subject to any disclaimer, the term of this patent is extended or adjusted under 35 U.S.C. 154(b) by 223 days.

(21) Appl. No.: 14/540,529

(22) Filed: Nov. 13, 2014

(65) Prior Publication Data

US 2016/0139660 A1 May 19, 2016

(51) Int. Cl.
| | |
|---|---|
| *G06F 3/01* | (2006.01) |
| *G06F 3/00* | (2006.01) |
| *G06F 3/02* | (2006.01) |
| *G06F 3/023* | (2006.01) |
| *G06F 3/033* | (2013.01) |
| *G06F 3/0338* | (2013.01) |
| *G06F 3/038* | (2013.01) |
| *G06F 3/0362* | (2013.01) |

(52) U.S. Cl.
CPC ............... *G06F 3/01* (2013.01); *G06F 3/002* (2013.01); *G06F 3/0202* (2013.01); *G06F 3/023* (2013.01); *G06F 3/033* (2013.01); *G06F 3/038* (2013.01); *G06F 3/0338* (2013.01); *G06F 3/0362* (2013.01); *G06F 2203/0382* (2013.01)

(58) Field of Classification Search
CPC .... G06F 3/01; G06F 2203/0382; G06F 3/002; G06F 3/0202; G06F 3/023; G06F 3/033; G06F 3/0338; G06F 3/0362; G06F 3/038
USPC .................................................. 345/156–184
See application file for complete search history.

(56) References Cited

U.S. PATENT DOCUMENTS 5,825,617 A * 10/1998 Kochis .................. G06F 1/1626
361/679.43
5,865,546 A * 2/1999 Ganthier ............... G06F 3/0202
341/22

(Continued)

*Primary Examiner* — Dmitriy Bolotin
(74) *Attorney, Agent, or Firm* — Tai W. Nahm; Miller Thomson LLP

(57) ABSTRACT

The present disclosure relates to a modular apparatus and system for providing customized, reconfigurable user inputs. In an aspect, there is provided a modular apparatus comprising a plurality of reconfigurable Input Modules with different types of user inputs, such as buttons, sliders, knobs, joysticks, trackballs, touch pads, touch screens, and other types of user interfaces. The Input Modules may be physically interconnected to a Master Module which is adapted to communicate with each Input Module and to a System Controller Application running on a connected computing device. The Input Modules are reconfigurable into any number of different physical layouts. The Master Module determines the physical layout of the connected Input Modules, and communicates the layout to the System Controller Application. The function of each Input Module is then programmed via the System Controller Application and the Master Module for performing specific functions in a compatible computer application.

20 Claims, 15 Drawing Sheets

(56) References Cited

U.S. PATENT DOCUMENTS

| | | | | |
|---|---|---|---|---|
| 6,703,962 B1* | 3/2004 | Marics | ............... | A24F 19/105 |
| | | | | 340/12.55 |
| 6,788,285 B2* | 9/2004 | Paolucci | ............... | G06F 1/1626 |
| | | | | 200/176 |
| 6,795,318 B2* | 9/2004 | Haas | ............... | H04M 1/0254 |
| | | | | 361/728 |
| 7,758,424 B2* | 7/2010 | Riggs | ............... | A63F 13/06 |
| | | | | 341/20 |
| 8,018,726 B2* | 9/2011 | Friedlander | ............... | H01H 9/0235 |
| | | | | 345/156 |
| 8,206,220 B2* | 6/2012 | Young | ............... | A63F 13/06 |
| | | | | 273/148 B |
| 9,377,827 B2* | 6/2016 | Matias | ............... | G06F 1/189 |
| 9,507,434 B2* | 11/2016 | Bruno | ............... | G06F 3/0202 |
| 2003/0052860 A1* | 3/2003 | Park | ............... | H04B 1/202 |
| | | | | 345/156 |
| 2004/0125080 A1* | 7/2004 | Ha | ............... | G08C 17/00 |
| | | | | 345/156 |
| 2010/0081377 A1* | 4/2010 | Chatterjee | ............... | G06F 1/1632 |
| | | | | 455/41.1 |
| 2010/0081473 A1* | 4/2010 | Chatterjee | ............... | G06F 1/1632 |
| | | | | 455/559 |
| 2012/0218211 A1* | 8/2012 | McRae | ............... | G06F 1/1656 |
| | | | | 345/173 |
| 2013/0021266 A1* | 1/2013 | Selim | ............... | G06F 3/0487 |
| | | | | 345/173 |
| 2013/0120241 A1* | 5/2013 | Czupi | ............... | G06F 3/01 |
| | | | | 345/156 |

* cited by examiner

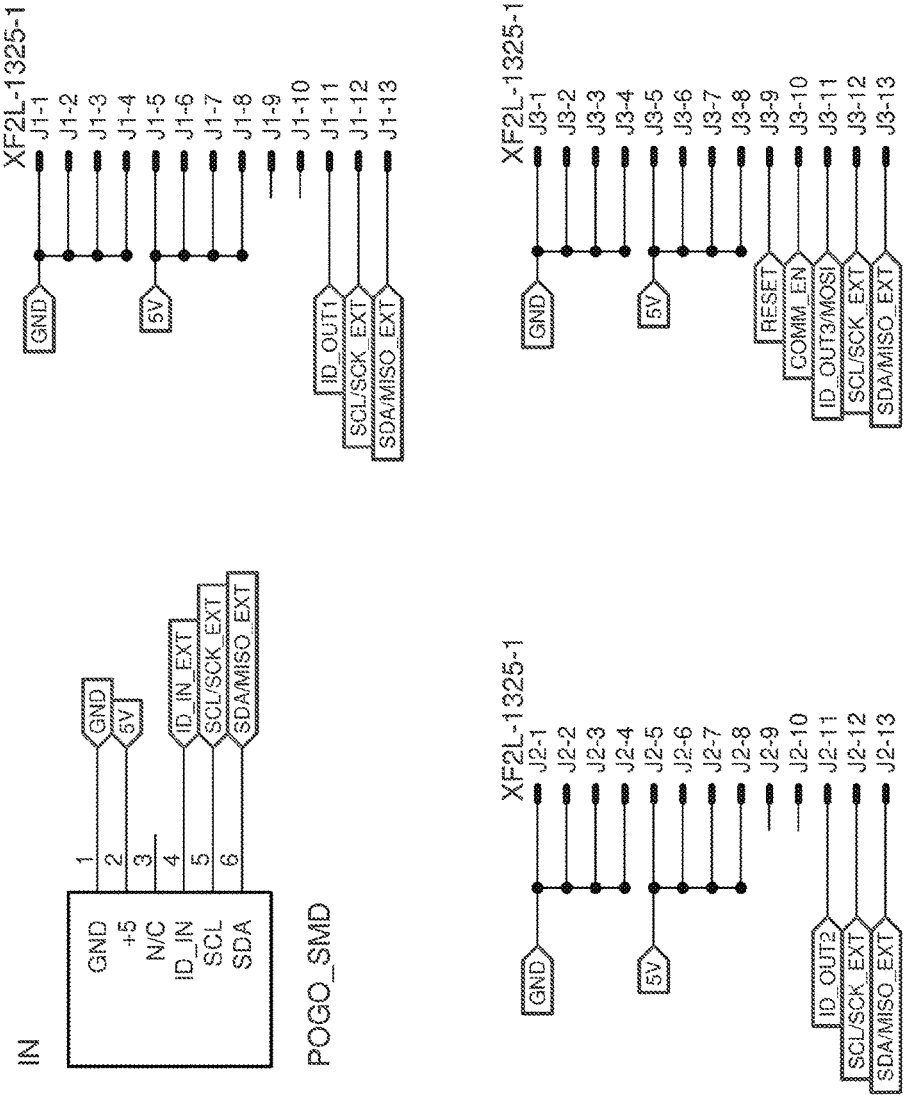
FIG. 5A Connections

Microcontroller

MODULAR APPARATUS AND SYSTEM FOR RECONFIGURABLE USER INPUTS

FIELD OF THE INVENTION

The present disclosure relates generally to a modular apparatus and system for providing reconfigurable user inputs.

BACKGROUND

Computers are vital components in carrying out many important tasks. There is a broad landscape of computer applications and workflows that computer users utilize to perform a variety of tasks. In spite of this variety, interacting with a computer is still largely accomplished through a "one-size-fits-all" keyboard, mouse, touch pad and touch screen interfaces which are the de facto computer input interfaces. Operating systems and applications have been designed for the majority of the past 30 years to work with these types of interfaces, but they can be unsuitable or inefficient for many tasks done on a computer. Examples of such tasks include: photo editing, graphic design, video editing, and music production. In each of these cases the user must often use a keyboard and mouse to interact with interfaces mimicking older analog hardware interfaces (knobs, sliders, radio buttons, etc.), but without the tactility, precision, or ease of use of these older interfaces.

Consequently, what is needed is an improved apparatus and system for addressing these limitations in existing computer input interfaces.

SUMMARY

The present disclosure relates to a modular apparatus and system for providing customized, reconfigurable user inputs.

In an aspect, there is provided a modular apparatus comprising a plurality of reconfigurable Input Modules with different types of user inputs, such as buttons, sliders, knobs, joysticks, trackballs, touch pads, touch screens, and other types of user interfaces.

In an embodiment, the Input Modules have a common base which is suitably shaped to allow the Input Modules to detachably interconnect with each other. For example, the Input Modules may be generally square shaped, or of a rectangular shape which is the size of two square shaped modules placed together.

In alternative embodiments, it will be appreciated that the Input Modules may be other shapes that may detachably interconnect, such as a hexagonal shape to form a honeycomb pattern. The Input Modules may also be a mix of different shapes which are selected to allow detachable interconnection and reconfiguration.

In an embodiment, the Input Modules may physically connect using interconnecting magnets provided on one or more sides of the base. The polarity of the magnets on the one or more sides of the base may be used to define which sides of two Input Modules can connect together, and which sides of two Input Modules are repelled to prevent an interconnection along those sides. At the same time, the magnets allow two Input Modules to be separated if it is desired to reconfigure the Input Modules in a different configuration.

In another embodiment, the Input Modules may communicate via an electrical interconnection made between two detachably interconnected Input Modules. For example, the electrical interconnection may be made by male and female interconnectors.

In a preferred embodiment, the electrical interconnection is made via resiliently depressible pogo pins and corresponding contact pads.

In another preferred embodiment, the configuration of the Input Modules and the type of electrical connections enable the Input Modules to be hot-swappable, i.e., connected and disconnected while the device is on.

In another embodiment, at least one of the Input Modules is a Master Module which is configured to communicate with each interconnected Input Module. The Master Module includes a processor and a memory, and is capable of communicating with each of the interconnected Input Modules, and with an attached computing device, such as a desktop or laptop computer, for example. The connection between the Master Module and the computing device may be hardwired, or may alternatively be a wireless connection made by any number of different types of short distance wireless connection, such as Wi-Fi, Bluetooth, BLE or NFC, for example.

In an embodiment, the Master Module is adapted to determine the physical layout of all interconnected Input Modules and the types of interconnected Input Modules, and dynamically assign addresses to each of the interconnected Input Modules. The Master Module communicates the physical layout and assigned addresses to System Controller Application executing on the computing device. This allows each of the interconnected Input Modules to also communicate with and be addressable by the System Controller Application through the Master Module.

In another embodiment, the System Controller Application is adapted to interface with one or more computer applications which require a user input, and enables the one or more computer applications to assign a control function to each attached Input Module via the Master Module, and to convert user input via the Input Modules into corresponding application commands. For example, for a photo editing computer application, a plurality of Input Modules comprising buttons, dials and sliders may be interconnected with the Master Module, and each Input Module may be assigned to specific control functions such as exposure, contrast, color saturation, color balance, sharpness, noise, etc. Operating each Input Module will thus control the assigned function.

In another embodiment, the physical layout of the Input Modules is replicated on a display of the computing device by the System Controller Application to allow a user to more easily assign computer application functions to each Input Device. If one or more Input Modules are reconfigured and the physical layout of the Input Modules changes, the new configuration will be replicated on the display to reflect the change.

Advantageously, a computer user is now able to reconfigure a plurality of Input Modules to their own preferences, and can assign different computer application functions to different types of user inputs provided by the Input Modules in a virtually unlimited number of configurations, providing great flexibility and customization.

In this respect, before explaining at least one embodiment of the system and method of the present disclosure in detail, it is to be understood that the present system and method is not limited in its application to the details of construction and to the arrangements of the components set forth in the following description or illustrated in the drawings. The present system and method is capable of other embodiments and of being practiced and carried out in various ways. Also,

BRIEF DESCRIPTION OF THE DRAWINGS

FIGS. 5A to 5C show circuitry of various components of an illustrative Input Module.

DETAILED DESCRIPTION

As noted above, the present disclosure relates to a modular apparatus and system for providing customized, reconfigurable user inputs.

Certain terminology as used in the present disclosure is defined as follows:

CDC/ACM—Communications Device Class/Abstract Control Model is a vendor-independent publicly documented protocol that can be used for emulating serial ports over USB.

I²C—A serial bus consisting of two lines—SCL (clock line), and SDA (data line). These lines are open-drain (i.e. when the bus is unused, the SDA line remains at logic High). The following diagram demonstrates the I²C topology.

HID—USB HID (Human Interface Device)—A device class for a range of devices such as Keyboards, Mice, Joysticks, etc. Most modern operating systems can interface directly with these devices without the need for external software.

JSON—JavaScript Object Notation. A common human-readable scheme for defining and transmitting attribute-value pairs.

UUID—A globally unique number that is different for every different type of Input Module or Master Module.

Figure 1:
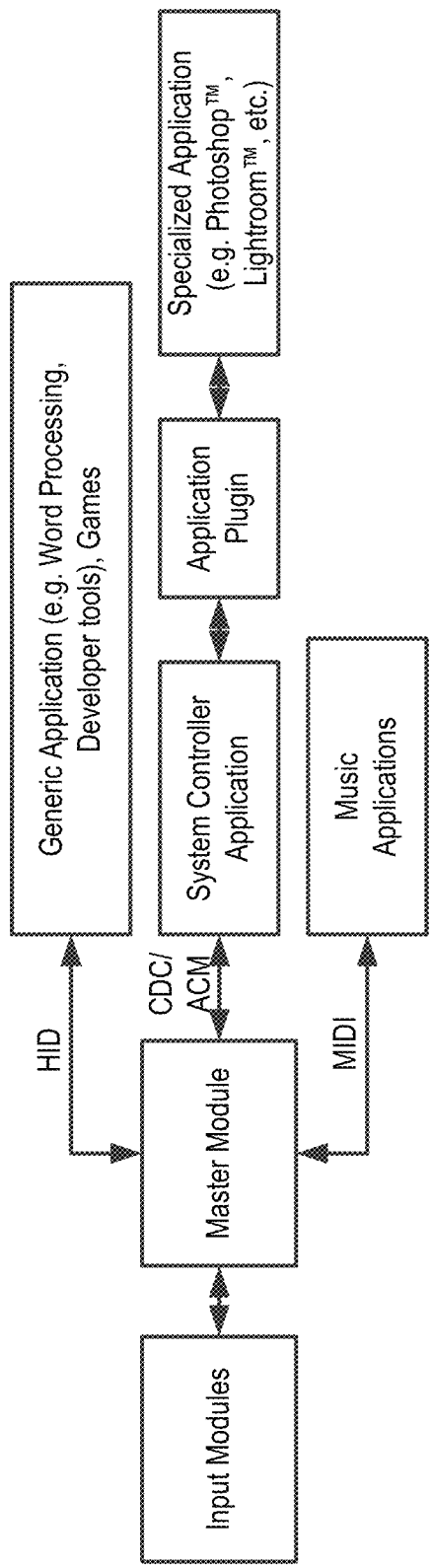
FIG. 1 shows a schematic block diagram of a system architecture in accordance with an embodiment.

Referring to FIG. 1, shown is a schematic block diagram of an illustrative system architecture in accordance with an embodiment. As shown, a plurality of Input Modules are connected to a Master Module, which in turn is connected to various types of computer applications, such as Word Processing, Development Tools, Games, Music, and Specialized Applications via a suitable application plug-in.

In an embodiment, a Controller Application running on a connected computer device is responsible for communicating with the Master Module. The Controller Application processes the incoming layout strings and presents the corresponding layout to the user. It also allows the user to set custom functions and operations to the Input Module actions. The Controller Application also acts as an intermediary between user applications and the Input Modules and Master Module, translating the hardware commands into user application actions.

The Controller Application allows the user to select which application or mode the hardware will interact with. Upon choosing a desired application or mode, the app presents an interface to configure the module functions as desired.

The Controller Application also bundles plug-ins that interface with several user applications and translate commands from the Controller Application into actions in the corresponding user application. This mechanism enables specialized control that the user applications themselves do not expose by default. These plug-ins communicate with the Controller Application through inter-process sockets.

The Controller Application also presents the user with default mappings based on the most common functions of each user application. The Controller Application can also remember the functions assigned to individual modules (through the use of the module's UUID), and restore functionality if the user disconnects and reconnects the module (without having the user remap the functionality).

In a preferred embodiment, the modular apparatus and system comprises a plurality of reconfigurable Input Modules with different types of user inputs, such as buttons, sliders, knobs, joysticks, trackballs, touch pads, touch screens, and other types of user interfaces. A microcontroller circuit in each Input Module converts the input into a signal sent to the Master Module. The Input Modules may also include RGB LEDs that can illuminate as dictated by the user or as controlled by the Controller Application.

Figure 2:
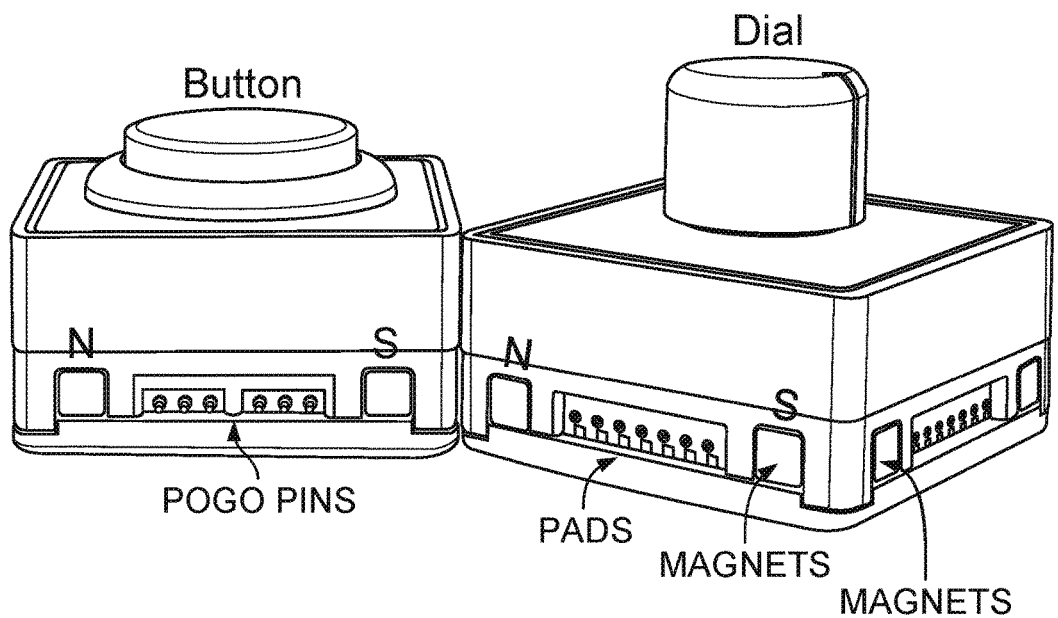
FIG. 2 shows two different types of Input Modules by way of illustration.

By way of example, FIG. 2 shows two different types of Input Modules, a first including a Button control, and a second including a Dial. Virtually any type of user interface that may be built into a modular Input Module may be used.

Figure 3:
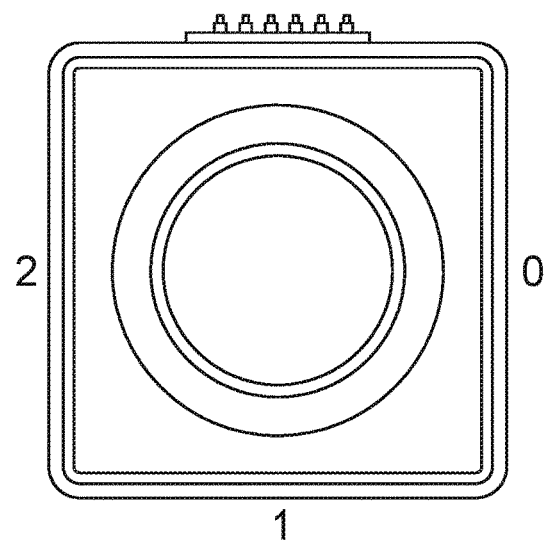
FIG. 3 shows an illustrative example of a square shaped Input Module.

The Input Modules have a common base which is suitably shaped to allow the Input Modules to detachably interconnect with each other. For example, as shown in FIG. 3, the Input Modules may be generally square shaped, or of a rectangular shape which is the size of two square shaped modules placed together.

It will be appreciated that the Input Modules may be other shapes that may detachably interconnect, such as a hexagonal shape to form a honey-comb pattern. The Input Modules may also be a mix of different shapes which are selected to allow detachable interconnection and reconfiguration.

The Input Modules may physically connect using interconnecting magnets provided on one or more sides of the base, as illustrated in FIG. 2. The polarity of the magnets positioned on the one or more sides of the base may be used to define which sides of two Input Modules can connect together, and which sides of two Input Modules are repelled to prevent an interconnection along those sides. At the same time, the magnets are selected to allow the two Input Modules to be separated if it is desired to reconfigure the Input Modules in a different configuration.

The Input Modules may communicate via an electrical interconnection made between two detachably interconnected Input Modules. For example, the electrical interconnection may be made by male and female interconnectors. In a preferred embodiment, as illustrated in FIG. 2, the electrical interconnection is made via resiliently depressible pogo pins and corresponding contact pads. The configuration of the Input Modules and the type of electrical connections enable the Input Modules to be hot-swappable, i.e., connected and disconnected while the device is on.

At least one of the Input Modules is a Master Module, as illustrated in FIG. 3, which is configured to communicate with each interconnected Input Module. The Master Module is ultimately responsible for processing all of the input states of the Input Modules, and then communicating this data to the user's computer. The Master Module is also tasked with keeping track of the current layout of all the modules.

In an embodiment, the Master Module interfaces with the computer through a micro-USB port and includes a display, for example a 128×128 pixel colour OLED screen, capable of displaying images such as the current application profile, and which application is presently being controlled. These features can be seen in FIG. 3.

The Master Module includes a processor, a memory, and preferably a display, and is capable of communicating with each of the interconnected Input Modules. The Master Module is also configured to interconnect with an attached computing device, such as a desktop or laptop computer, for example.

The Master Module may communicate with the computing device using various protocols, for example: CDC/ACM (Communications Device Class/Abstract Control Model), HID (Human Interface Device), and MIDI (Musical Interface Digital Interface). The Master Module maintains communication over the CDC/ACM protocol, and can switch modes between HID, MIDI, or CDC/ACM.

The Master Module may connect to the computer via a hardwired connection, such as USB cable. The connection may alternatively be a wireless connection made by any number of different types of short distance wireless connection, such as Wi-Fi, Bluetooth, BLE or NFC, for example.

The Master Module is capable of communicating with the computer in at least three different ways: through a custom data protocol (CDC/ACM), HID (standard keyboard/mouse/joystick protocol), and MIDI (used in music software). In the present, illustrative example, the Master Module and Input Modules communicate on a common I²C bus for data transfer, and each module port contains distinct One-Wire Serial Interfaces used only for module detection and assigning I²C addresses.

In an embodiment, the Master Module is adapted to determine the physical layout of all interconnected Input Modules and the types of interconnected Input Modules, and dynamically assign addresses to each of the interconnected Input Modules.

Interconnection

Figure 4A:
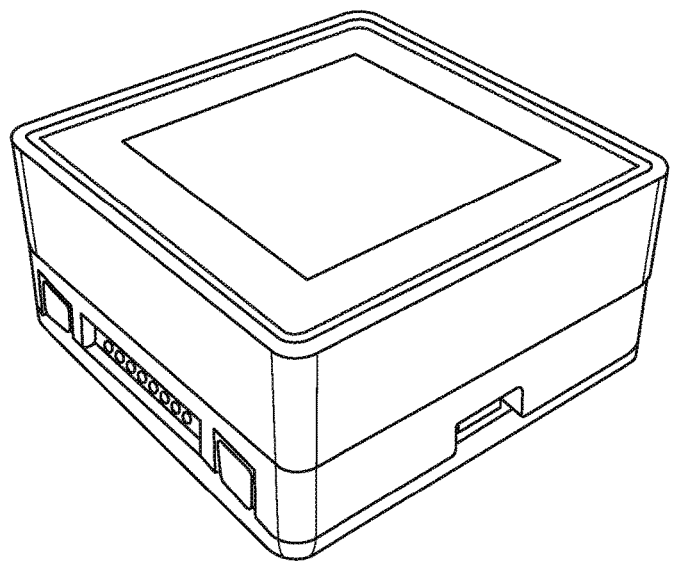
FIGS. 4A to 4F show an illustrative example of a Master Module interconnected with a plurality of Input Modules.
Figure 4B:
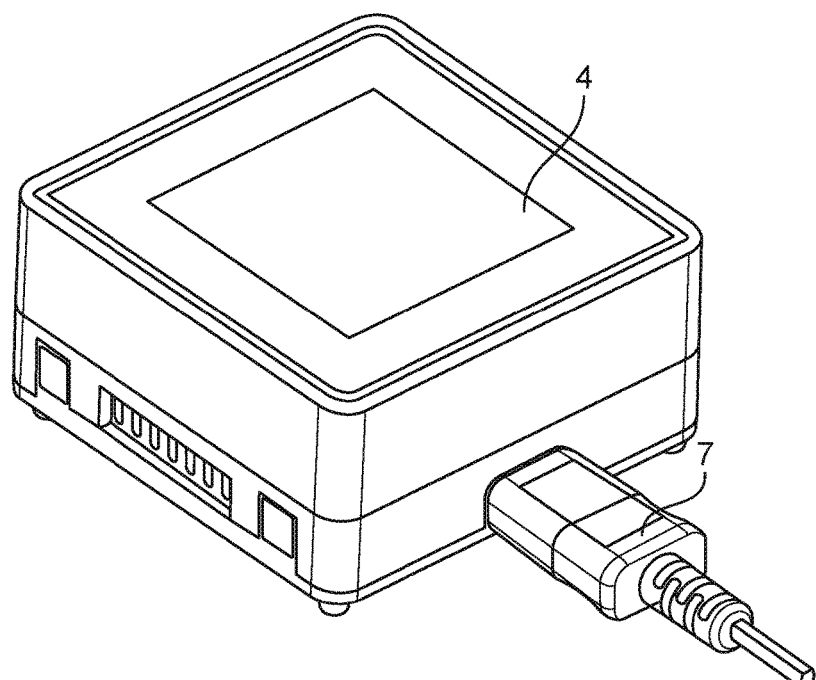
Figure 4C:
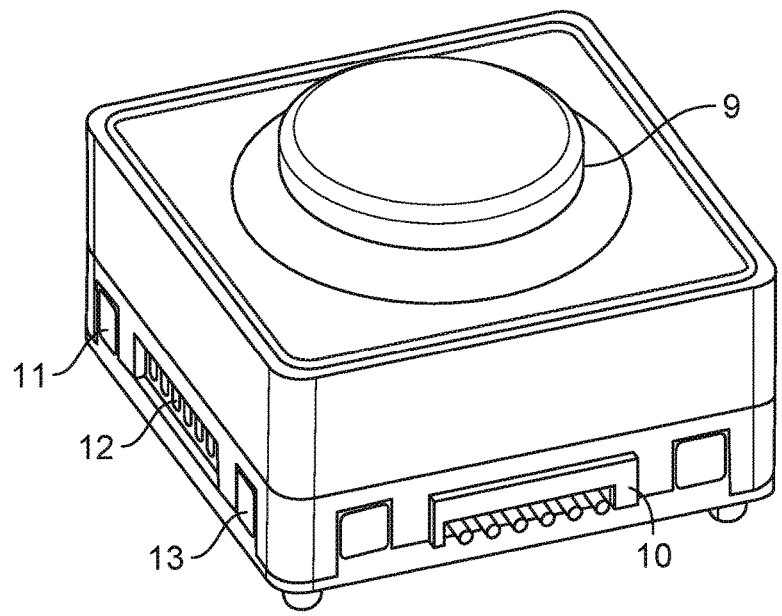
Figure 4D:
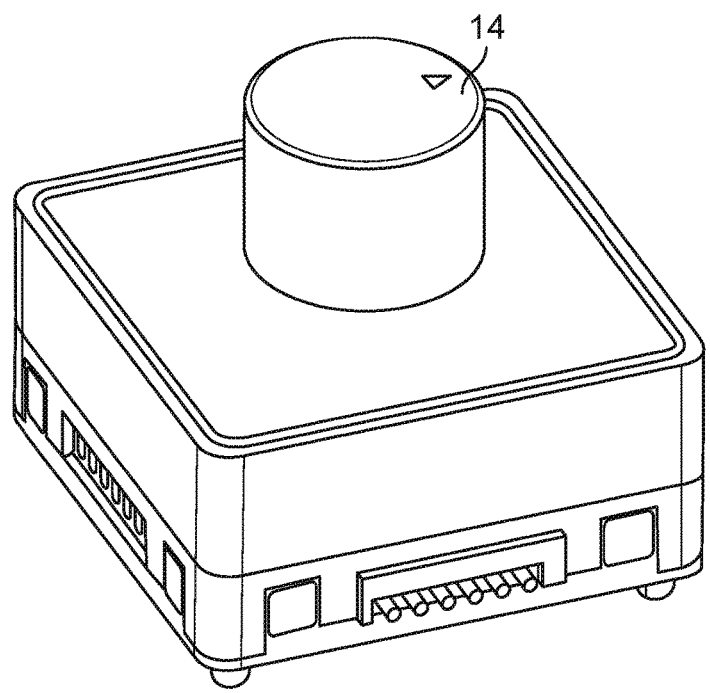
Figure 4E:
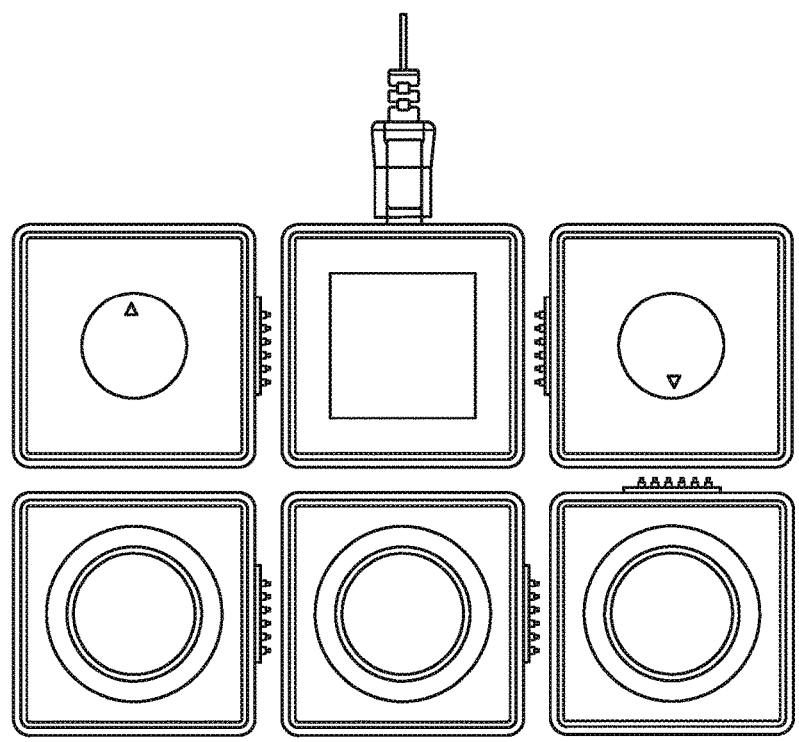
Figure 4F:
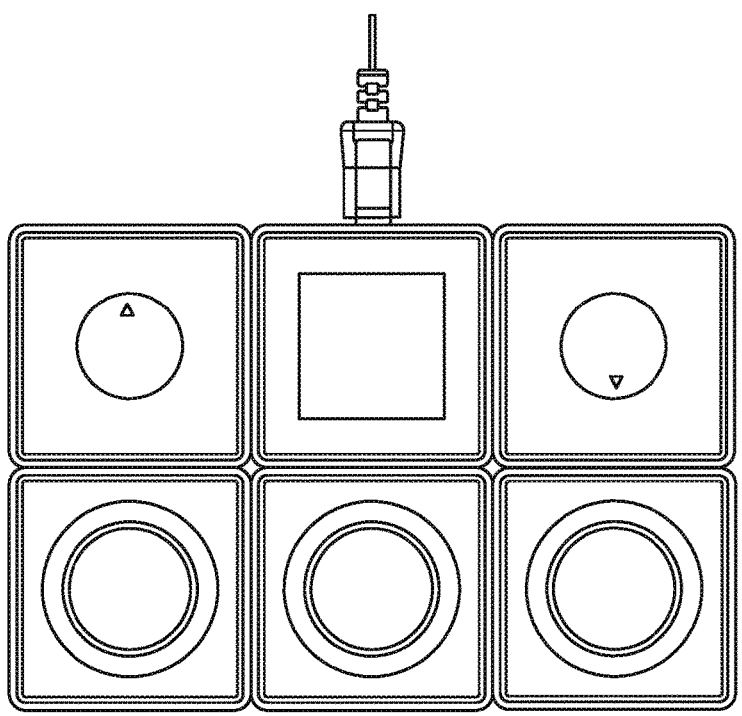

FIG. 4A to FIGS. 4A to 4F show an illustrative example of a Master Module interconnected with a plurality of Input Modules.

More particularly, FIGS. 4A and 4B show an illustrative Master Module having a screen 4 and a cable interconnection (e.g. USB) for connection to a computing device.

FIG. 4C shows an illustrative Button Input Module having a button 9 that may be depressed to perform a function. As shown, the button module includes magnets 11, 13 which are arranged in a polarity to allow connection of the Button Input Module to the Master Module or to another type of Input Module. While magnets are shown as the fastening devices in this illustrative example, it will be appreciated that another type of removable fastener may also be used.

A male port 10 (e.g. pogo pins) provides connection to a female port (e.g. contact pads) to provide an electrical interconnection between attached modules. While pogo pins and contact pads are illustrated, it will be appreciated that any number of different connectors may also be used.

FIG. 4D is an illustrative Dial Input Module having a dial 14 that may be operated to perform a function. The Dial Input Module similarly includes fastening devices and electrical interconnection points to allow the Dial Input Module to be interconnected to the Master Module, the Button Input Module, or to another type of Input Module.

FIGS. 4E and 4F depict one possible configuration of modules which may be arranged relative to each other as shown in FIG. 4E, then interconnected as shown in FIG. 4F.

Input Module Logic

Figure 5B:
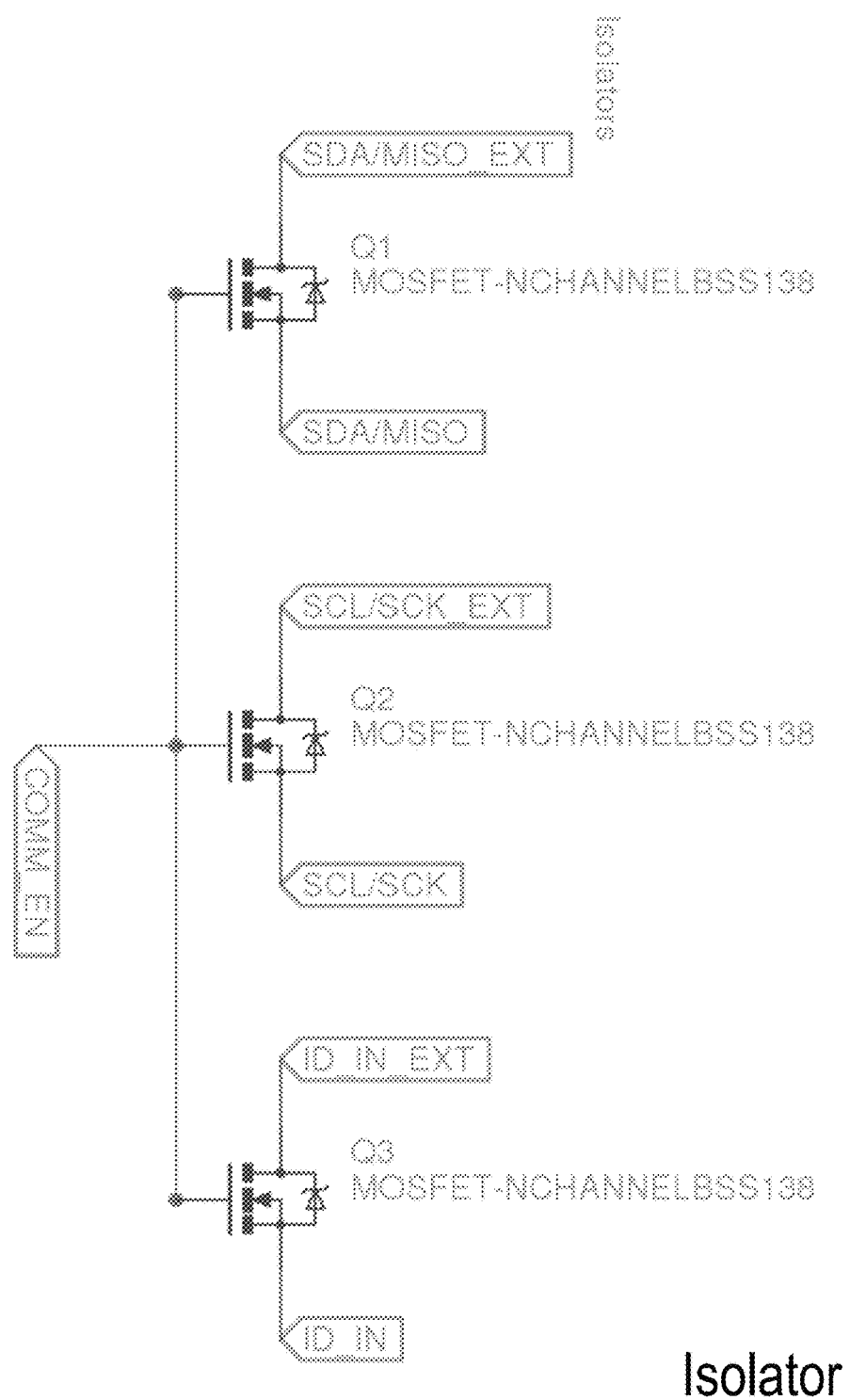
Figure 5C:
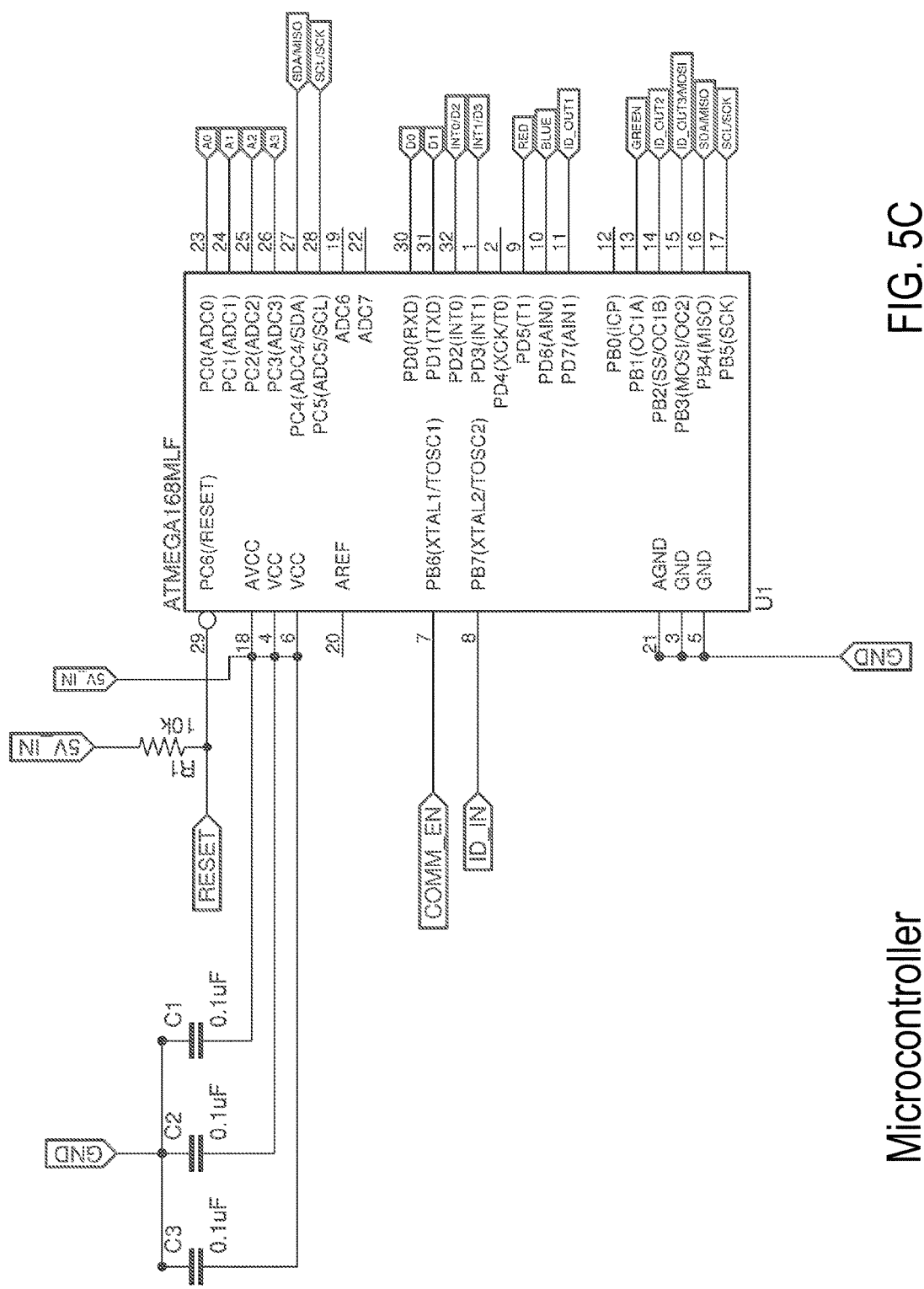

Now referring to FIG. 5, shown is a schematic flow chart of an illustrative Input Module process in accordance with an embodiment.

By way of illustration, FIG. 5 shows circuitry within an Input Module. The Input Module circuit is responsible for converting analog signals from the input peripherals into digital data and communicating this data to a Power Module. The Input Modules are also responsible for detecting when neighbouring Input Modules have been connected, and assigning I²C addresses to them.

The Input Module circuit consists of a microcontroller, peripheral input ports, male module pogo pins, and several female module pads. The circuit also consists of special circuitry to isolate the I²C bus from the microcontroller when the circuit is unpowered to prevent glitches on the bus during module connection/disconnection.

The microcontroller serves to process the analog input (button presses, dial turns/presses, slider position, etc.) and then send this data to the Master Module when queried. The microcontroller also receives detection and assignment commands from the Master Module, which respectively cause the microcontroller to detect newly plugged neighbouring modules, and assign newly plugged neighbouring modules I²C addresses.

The bus isolation circuitry serves to prevent the I²C bus from being pulled to logic when the module is connected. Without the circuitry, while the microcontroller is unpowered its internal protection diode would conduct, thus dropping the voltage of the I²C lines. The n-channel enhancement mode MOSFETs Q1, Q2, and Q3 serve to isolate these lines while the device is unpowered.

Figure 6:
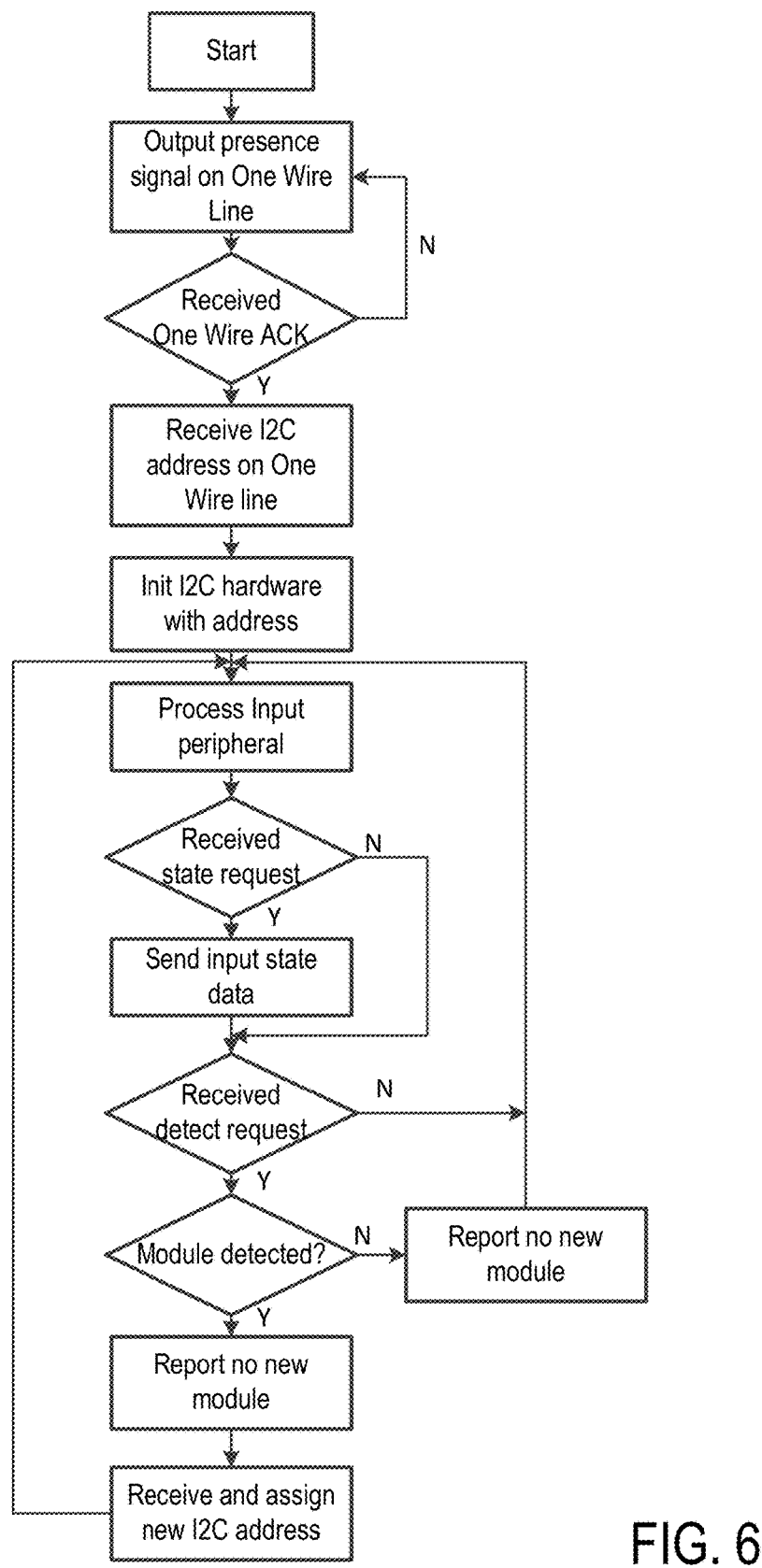
FIG. 6 shows a schematic flow chart of a method for detecting a new Input Module in accordance with an embodiment.

Now referring to FIG. 6, shown is a schematic flow chart of a method for detecting a new module plugged into an existing layout. In an embodiment, this method is performed on Input Modules, but may be performed by both Input Modules and Master Modules.

As shown, the method begins by detecting an output presence signal on a common One Wire line. While an acknowledgement from the One Wire line is not received, the method loops to detect an output presence. If a One wire acknowledgement is received, then the method proceeds to receive an I²C address on the One Wire line. The method then proceeds to initiate I²C hardware with the address.

The method then proceeds to process input peripherals, and if a state request is received, the method sends input state data. If no, then the method proceeds to determine if a detect request is received. If no, the method loops back to process an Input peripheral. If yes, the method proceeds to determine if a module is detected.

If no new modules are detected, this is reported, and the method reports no new module. If yes, the method proceeds to report the new module port, and the method then receives and assigns a new I²C address. The method then loops back to process an Input peripheral.

Figure 7:
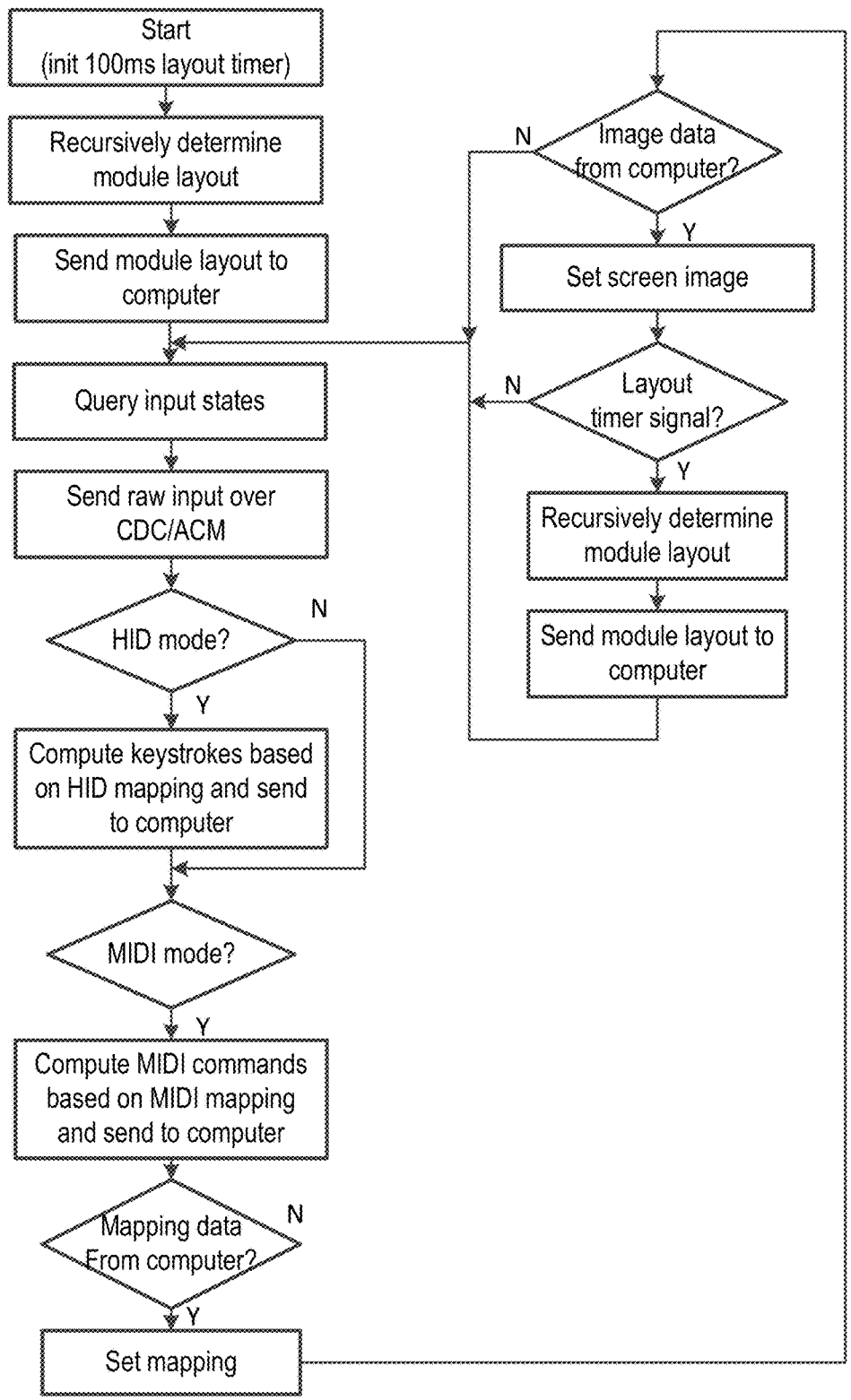
FIG. 7 shows a schematic flow chart of a method for determining the type of data and directing the data between the Master Module and an attached device.

Now referring to FIG. 7, shown is a schematic flow chart of an illustrative method for automatically determining the type of connection between the Master Module and a connected device. The method starts and first recursively determines the layout of the Input Modules, as detailed further below.

The detected layout of the Input Modules is then sent to the computing device. A query module checks for input status.

Upon detection of an input, the raw input is sent over CDC/ACM. If the raw input is HID mode, the method computes keystrokes based on HID mapping and sends to the computing device. If the raw data is MIDI mode, the method computes MIDI commands based on MIDI mapping and sends the MIDI commands to the attached MIDI device.

CDC/ACM is a custom data protocol is implemented over this communication interface. The module layout, input states, mappings and screen image data are communicated over this interface in a JSON format. Some examples of JSON format are as follows:

Sample JSON String for Two Module Layout (Button Module Plugged into Port 0 of Master):

```
{
"layout":
    {
        "uuid" : "8f168",
        "id": 0,
        "type": 0,
        "children" :
            [
                {
                    "uuid" : "d6907",
                    "id" : 1,
                    "type": 3,
                    "children":
                        [
                            null,
                            null,
                            null
                        ]
                },
                null,
                null
            ]
    },
    "module_count": 2
}
```

Sample JSON String for Button Press

```
{
"input":
    [
        {
            "id" : 1,
            "values": [1, 0, 0, 0, 0, 0, 0, 0]
        }
    ]
}
```

HID is based on the user-set mapping, the Master Module outputs the appropriate Keyboard, Mouse, and Joystick commands over the standard Human Interface Device interface.

MIDI is based on the user-set mapping, the Master Module outputs the appropriate MIDI commands. The Master Module sends an input event any time the user performs an action with any Input Module. The Master Module is capable of outputting MIDI commands such as Control Change and Note On/Note Off. A Control Change command is defined by a Channel, Controller Number, and Controller Value. Similarly, a Note command is defined by a Channel, Pitch, and Velocity.

The MIDI map specifies which input module values are mapped to specific Control Change or Note sets (i.e. Channel/Controller Number combination or Channel/Pitch combination).

When the user uses an input module mapped to a Control Change command, the Master Module emits a Control Change event corresponding to the mapped Channel/Controller Number and the Control Value as dictated by the input state of the module.

When the user uses an input module mapped to a Note command, the Master Module will emit a Note On or Note Off event when appropriate (e.g.: a Note On issued when a button is depressed, Note Off when a button is released) corresponding to the mapped Channel/Pitch.

If the data is an HID or MIDI map from the System Controller Application on the computing device, the method sets the internal mapping (represented as a dynamic table in the Master Module), where each table entry maps an HID or MIDI command to a specific Input Module state channel, as provided via the System Desktop Application executing on the computing device. An example HID map: {"hid map": [{"i":2, "s":[{"c":0, "k":30, "m":0}]}]} sets a key press action corresponding to the letter 'a' to the module with ID 2 and its channel 0.

If the data is image data from the computer, the method sets the screen image. The Controller Application can send image data in the form of a bitmap byte stream that the Master Module will store in memory. The Controller Application can also instruct the Master Module to display any image stored in memory on the screen.

If a layout timer signal is received, the method recursively determines the module layout, and sends the new module layout to the computer. The Master Module has an internal timer set to trigger an interrupt at a specific period (100 ms). When this interrupt occurs, the Master will execute layout and addressing logic.

Module Layout and Dynamic Addressing Scheme

Figure 8:
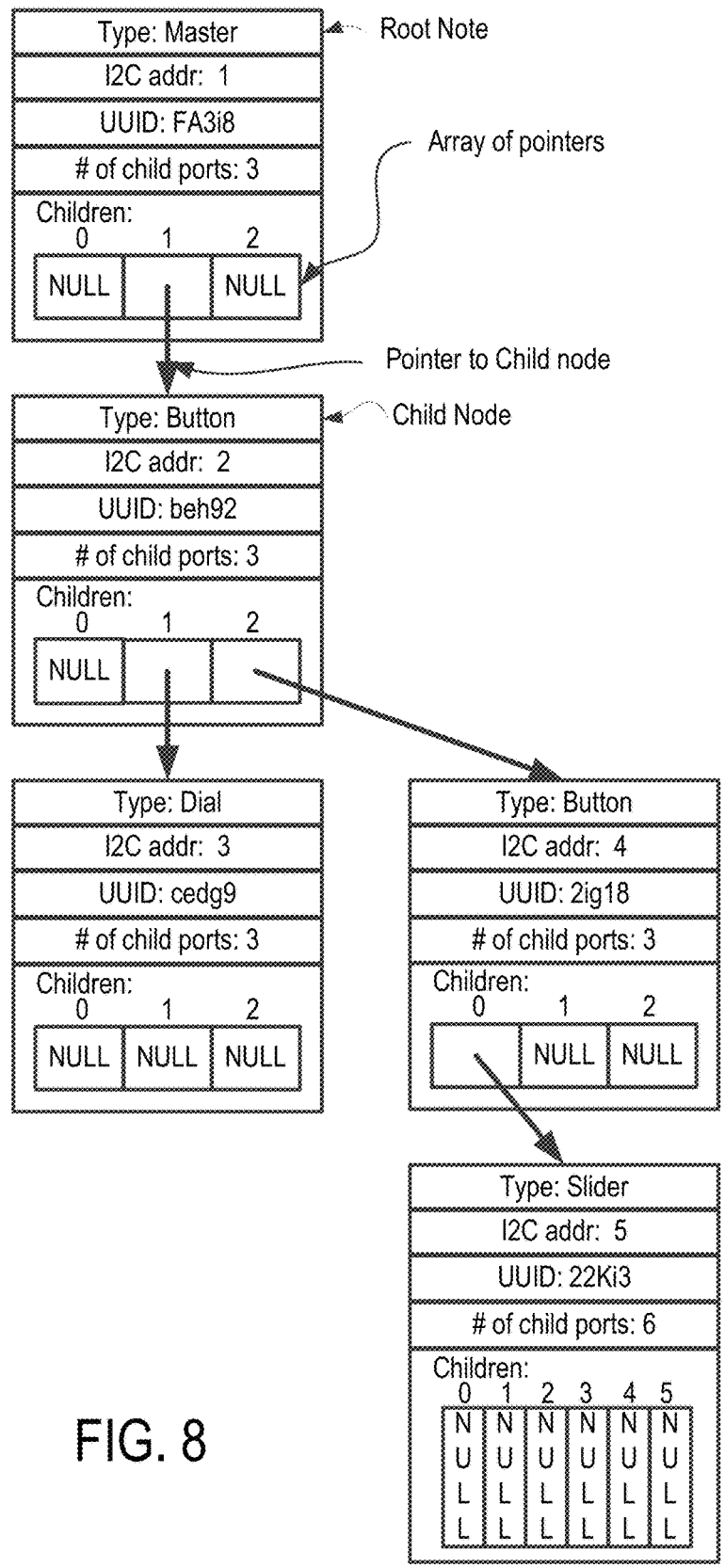
FIG. 8 shows a schematic block diagram illustrating how a Master Module may logically map a layout of interconnected Input Modules.

Now referring to FIG. 8, shown is a schematic block diagram illustrating how a Master Module may logically map a layout of interconnected Input Modules.

Figure 9:
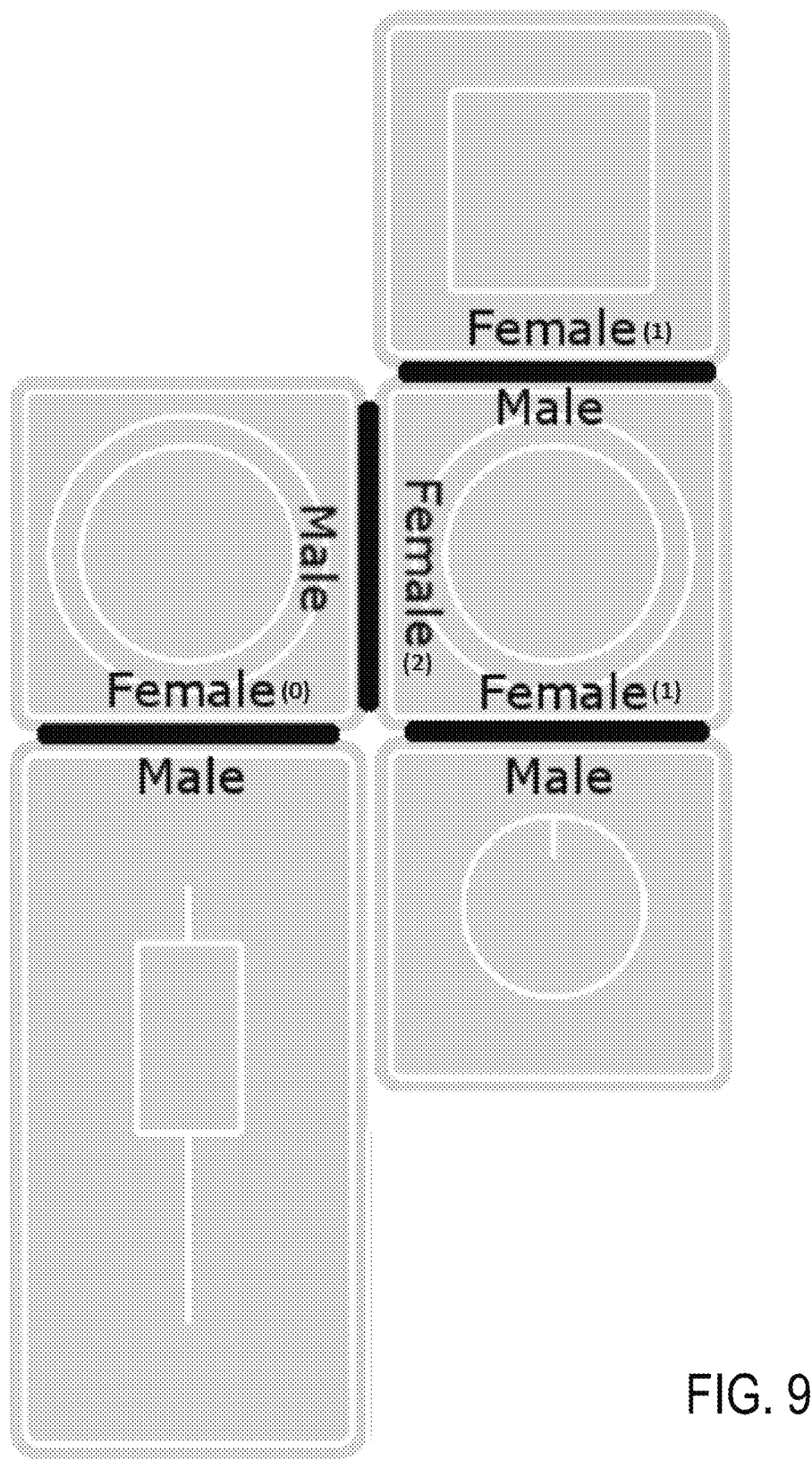
FIG. 9 shows another illustrative example of an interconnection between Input Modules of different shapes and sizes.

In an embodiment, the Master Module determines the layout of all the modules in a recursive breadth-first manner and internally stores the layout representation as an n-ary tree of variable size. Each node of the n-ary tree represents a module, where the node contains information such as the type of module, I²C address of the module, a Universal Unique Identifier (UUID), number of child ports, and pointers to child nodes. FIG. 8 shows a layout tree representation and FIG. 9 shows an illustration of the actual corresponding layout. The port gender configuration in conjunction with the address/presence lines allows position and orientation information of the mated modules to be determined, which no other conventional bus provides. The Master also keeps track of the assigned I²C addresses as an ordered array.

In an embodiment, the Master Module employs the following layout and dynamic addressing scheme every 100 ms:

1. The Master Module first checks its female ports for the presence of any modules (using the presence/addressing line), and if any are detected, the nodes are created and added to the internal layout tree. The Master assigns the next sequential addresses available, and consequently adds the addresses to the Address Array.
2. The Master then traverses the tree in a breadth-first manner, querying the Module defined by the current node via I2C.
3. The Master queries the current node and asks it to detect the presence of any new Modules.
4. If the current node reports a new child present in step 3, the Master tells the module corresponding to the current node to assign the next sequential address available. The Master adds this address to the address array.
5. The Master creates the new child node, and queries the new module via I²C for information on type, UUID, and number of child ports. The Master sets the appropriate pointer of the current node to the new child node.
6. The Master repeats steps 2-5 until no more new children are detected.

In an embodiment, the Master queries all the I²C addresses in the Address Array sequentially when getting the corresponding Input Module states. If a module fails to respond to the query, the Master removes the corresponding node and sub-nodes from the layout tree, and removes the corresponding addresses from the Address Array.

Inter-Module Bus Communication

Figure 10:
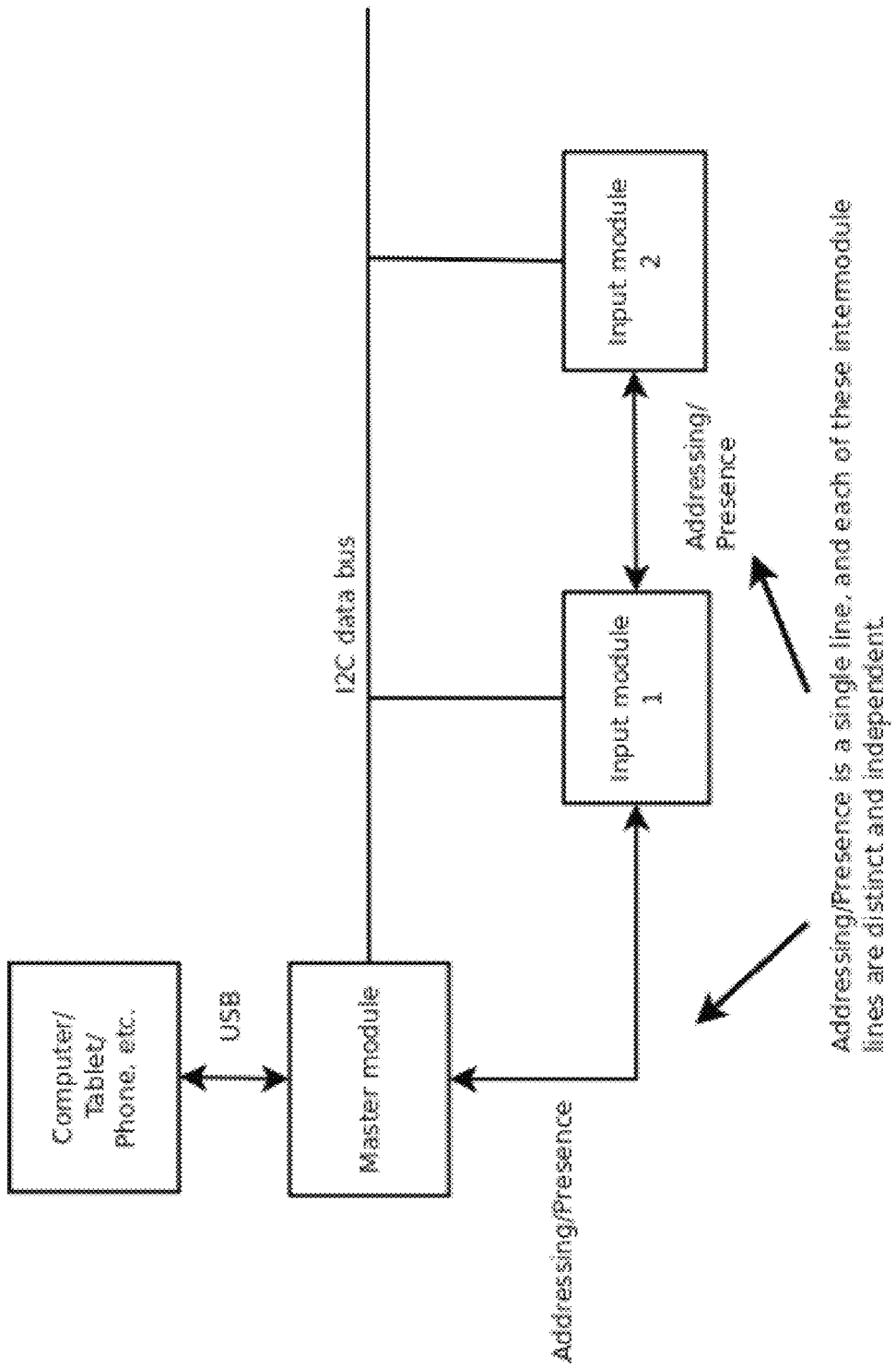
FIG. 10 shows a schematic block diagram of a logical bus architecture for interconnecting the Master Module to a plurality of Input Modules.
Figure 11A:
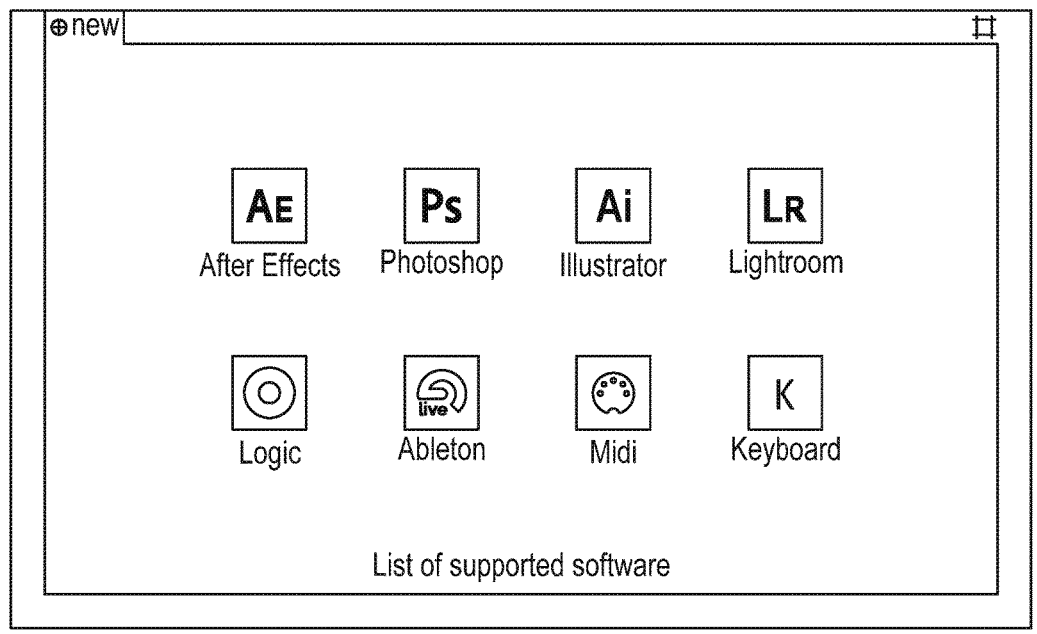
FIG. 11A shows a screen shot of various computer applications that may be mapped.
Figure 11B:
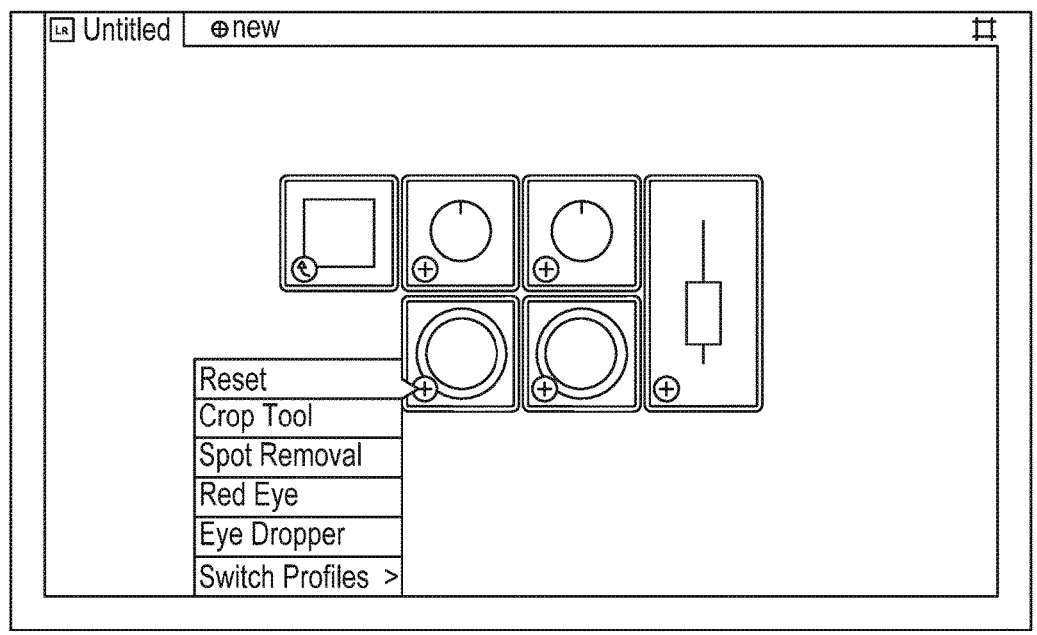
FIG. 11B shows an illustrative screen for displaying a current physical layout on a computer display, and for mapping the function of each Input Module using a drop down menu.
Figure 12:
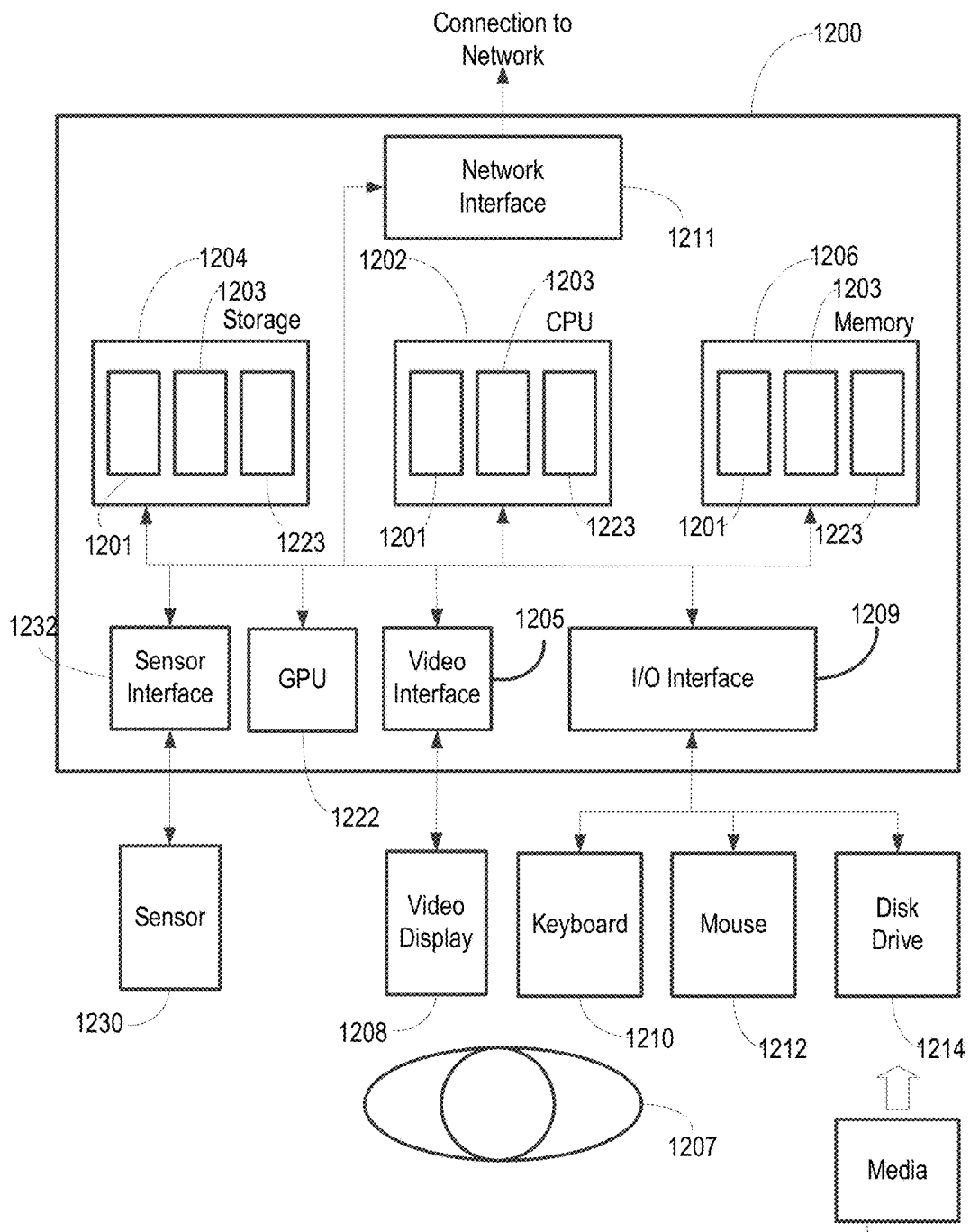
FIG. 12 shows a generic computer device which may provide an operating environment for various embodiments of the system.

Now referring to FIG. 10, shown is a schematic block diagram of a logical bus architecture for interconnecting the Master Module to a plurality of Input Modules.

In an embodiment, the Master Module and Input Modules communicate on a common I²C bus. The Master Module acts as the I²C master and requests the input states of each Input Module sequentially as it queries the address in its Address Array. The Master also uses the I²C bus to request child module detection and to assign addresses during the detection procedure.

The modules also use one-wire buses for the purposes of presence detection and I²C address assignment. In order to establish presence, the Input Module when connected asserts the line, and the detector after having detected the assertion then asserts the line. The newly connected module upon detecting the second assertion goes into receive mode on the line. The line transitions into a 19200 bps 8-N-1 serial line where the detector now transmits an I²C address and the new module receives it. Once the transmission is terminated, the new module transitions into the main state where it sets its I²C address to the one it received, and sends the input state upon the Master's request.

In an embodiment, the Master Module communicates the physical layout and assigned addresses to System Controller Application executing on the computing device. This allows each of the interconnected Input Modules to also communicate with and be addressable by the System Controller Application through the Master Module.

The System Controller Application is adapted to interface with one or more computer applications which require a user input, and enables the one or more computer applications to assign a control function to each attached Input Module via the Master Module. For example, for a photo editing computer application, a plurality of Input Modules comprising buttons, dials and sliders may be interconnected with the Master Module, and each Input Module may be assigned to specific control functions such as exposure, contrast, color saturation, color balance, sharpness, noise, etc.

In another embodiment, the physical layout of the Input Modules is replicated on a display of the computing device by the System Controller Application to allow a user to more easily assign computer application functions to each Input Device. If one or more Input Modules are reconfigured and the physical layout of the Input Modules changes, the new configuration will be replicated on the display to reflect the change.

Advantageously, a computer user is now able to reconfigure a plurality of Input Modules to their own preferences, and can assign different computer application functions to different types of user inputs provided by the Input Modules in a virtually unlimited number of configurations, providing great flexibility and customization.

Thus, in an aspect, there is provided a modular system for customizing user inputs for a computing device, comprising: a master module including a processor and a memory, and one or more electrical interconnection points for interconnecting one or more input modules; and at least one input module providing a type of user input, and one or more electrical interconnection points for connection to the master module, or to another input module; wherein, the master module is adapted to detect a configuration of any interconnected input modules, and to enable communication between each interconnected input module and the computing device in order to control one or more functions on the computing device with one or more user inputs.

In an embodiment, the master module is further adapted to detect any input module added to the modular system, and to detect any input module removed from the modular system, such that the master module detects a new configuration of any interconnected input modules after an input module has been added or removed.

In another embodiment, the master module and the input modules are sized and shaped to provide a electrical interconnection point along at least one side of each of module.

In another embodiment, the master module and the input modules are rectilinear, and are adapted to interconnect to another module on at least three sides.

In another embodiment, the master module or the input modules are substantially square, or substantially rectangular with a footprint of two adjacent squares.

In another embodiment, the master module, and each input module, further includes one or more fasteners for detachably interconnecting the master module to the at least one input module.

In another embodiment, the one or more fasteners comprise one or more magnets positioned with polarities oriented to allow detachable interconnection between the master module and one or more input modules, or between input modules, in any configuration permitted by the magnet polarities.

In another embodiment, the types of user input include one or more of buttons, sliders, knobs, joysticks, trackballs, touch pads, and touch screens.

In another embodiment, the one or more electrical interconnection points comprise resiliently depressible pogo pins and corresponding contact pads.

In another embodiment, the master module or the at least one input module further includes an output adapted to provide data or a signal.

In another embodiment, the output comprises one or more of a light source, a sound source, a mechanical vibration, or a display for displaying text or graphics.

In another embodiment, the computing device comprises one of a desktop or laptop computer, a tablet, or a mobile phone.

In another embodiment, the master module is adapted to communicate with the computing device using one of CDC/ACM, HID, or MIDI.

In another embodiment, the one or more electrical interconnection points provided on each input module establish an I2C bus connection with each other and with the master module.

In another embodiment, each interconnected input module is adapted to detect a newly connected input module on the I2C bus and to report the newly connected input module to the master module.

In another embodiment, the master module is adapted to assign an I2C bus address to the newly interconnected input module, thereby to make the newly interconnected input module addressable.

In another embodiment, the master module is further adapted to communicate the configuration or reconfiguration of any interconnected input modules and the type of user input provided by each interconnected input module to a system controller application executing on the computing device.

In another embodiment, the master module is further adapted to translate an action performed by a user input on an input module into a function or command to be relayed by the system controller application to a user application.

In another embodiment, the master module is further adapted to communicate the configuration of the interconnected input modules to the system controller application, such that the system controller application can logically map the configuration of the interconnected input modules on a graphical display for assigning each user input on an interconnected input module to a function or command in the user application.

In another embodiment, the system controller application is further adapted to provide via the graphical display a drop down menu of user application functions that may be mapped to each user input on the interconnected input modules.

It will be appreciated that various amendments and modifications may be made to the illustrative embodiments described herein without departing from the scope of the invention, and that the examples provided in the present disclosure are not limiting. Rather, the scope of the invention is defined by the following claims which should be given their broadest interpretation consistent with the scope of the present disclosure.

The invention claimed is:

1. A modular system for customizing user inputs for a computing device, comprising:
   a master module including a processor and a memory, and one or more electrical interconnection points for interconnecting one or more input modules via a bus connection; and
   at least one input module providing a type of user input, and one or more electrical interconnection points for connection to the master module or to another input module via the bus connection;
   wherein, the master module is adapted to detect a configuration of any interconnected input modules, including position and orientation of each interconnected module, and to dynamically assign a bus address to each of the interconnected input modules, thereby to make the interconnected input modules addressable and logically mappable, and to enable communication between each interconnected input module and the computing device in order to control one or more functions on the computing device with one or more user inputs.

2. The modular system of claim 1, wherein the master module is further adapted to detect any input module added to the modular system, and to detect any input module removed from the modular system, such that the master module detects a new configuration of any interconnected input modules after an input module has been added or removed.

3. The modular system of claim 2, wherein the master module and the input modules are sized and shaped to provide an electrical interconnection point along at least one side of each of module.

4. The modular system of claim 3, wherein the master module and the input modules are rectilinear, and are adapted to interconnect to another module on at least three sides.

5. The modular system of claim 4, wherein the master module or the input modules are substantially square, or substantially rectangular with a footprint of two adjacent squares.

6. The modular system of claim 1, wherein the master module, and each input module, further includes one or more fasteners for detachably interconnecting the master module to the at least one input module.

7. The modular system of claim 6, wherein the one or more fasteners comprise one or more magnets positioned with polarities oriented to allow detachable interconnection between the master module and one or more input modules, or between input modules, in any configuration permitted by the magnet polarities.

8. The modular system of claim 1, wherein the types of user input include one or more of buttons, sliders, knobs, joysticks, trackballs, touch pads, and touch screens.

9. The modular system of claim 1, wherein the one or more electrical interconnection points comprise resiliently depressible pogo pins and corresponding contact pads.

10. The modular system of claim 9, wherein the modular system is further adapted to provide one or more outputs to the one or more interconnected modules, the one or more outputs comprising a light source, a sound source, a mechanical vibration, or a display for displaying text or graphics.

11. The modular system of claim 1, wherein the master module or the at least one input module further includes an output adapted to provide data or a signal.

12. The modular system of claim 1, wherein the computing device comprises one of a desktop or laptop computer, a tablet, or a mobile phone.

13. The modular system of claim 1, wherein the master module is adapted to communicate with the computing device using one of CDC/ACM (Communications Device Class/Abstract Control Model), HID (Human Interface Device), or MIDI (Musical Interface Digital Interface).

14. The modular system of claim 1, wherein the bus connection is an I$^2$C (Inter-Integrated Circuit) bus connection.

15. The modular system of claim 14, wherein each interconnected input module is adapted to detect a newly connected input module on the I$^2$C bus and to report the newly connected input module to the master module.

16. The modular system of claim 15, wherein the master module is further adapted to communicate the configuration or reconfiguration of any interconnected input modules and the type of user input provided by each interconnected input module to a system controller application executing on the computing device.

17. The modular system of claim 14, wherein the master module is adapted to assign an $I^2C$ bus address to the newly interconnected input module, thereby to make the newly interconnected input module dynamically addressable.

18. The modular system of claim 17, wherein the master module is further adapted to translate an action performed by a user input on an input module into a function or command to be relayed by the system controller application to a user application.

19. The modular system of claim 18, wherein the master module is further adapted to communicate the configuration of the interconnected input modules to the system controller application, such that the system controller application can logically map the configuration of the interconnected input modules on a graphical display for assigning each user input on an interconnected input module to a function or command in the user application.

20. The modular system of claim 19, wherein the system controller application is further adapted to provide via the graphical display a drop down menu of user application functions that may be mapped to each user input on the interconnected input modules.

\* \* \* \* \*